ANTI-RACE FLIP-FLOP

Filed Aug. 16, 1963

INVENTOR
MERTON WALLACE MOODY,
BY
Robert H. Himes
ATTORNEY.

3,247,399
ANTI-RACE FLIP-FLOP

Merton Wallace Moody, Anaheim, Calif., assignor to Hughes Aircraft Company, Culver City, Calif., a corporation of Delaware Filed Aug. 16, 1963, Ser. No. 302,599
5 Claims. (Cl. 307—88.5)

Figures 1, 2:
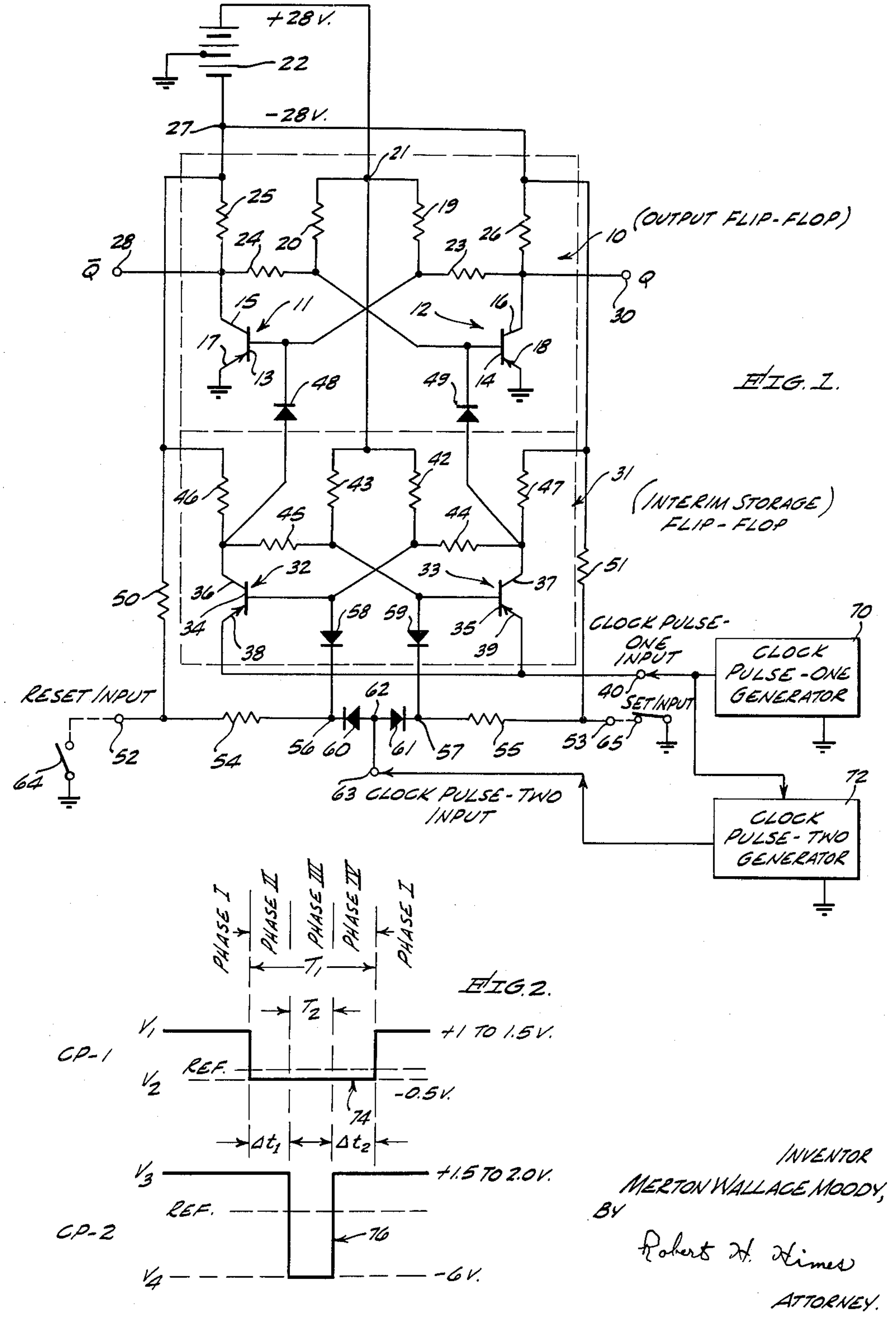

This invention relates to an anti-race one-bit storage element and, more particularly, to a flip-flop capable of operation over a wide range of conditions without the use of delay networks or closely controlled clock pulses. "Race" is defined as the premature response to input logic by a logical element or storage element due, for example, to the fast operation of an input element in conjunction with a finite width of the clock pulses.

Contemporary anti-race characteristics are achieved by means of delay networks such as, for example, chokes, capacitors, addition of gates or by narrow clock pulses. Although somewhat critical, these methods have been successful although restricted as to range of operation.

It is therefore an object of the present invention to provide an improved bistable storage element.

Another object of the present invention is to provide an anti-race one-bit storage element capable of operation over a wide range of conditions.

Still another object of the present invention is to provide an anti-race one-bit storage element that does not incorporate or use delay networks such as chokes, capacitors or additional gates or closely controlled clock pulses.

In accordance with the present invention, a first pair of transistors provide a principal storage element, and a second pair of transistors provide an interim memory function. Associated diodes and other basic circuit components are employed to prevent the second pair of transistors from being affected from the "reset" or the "set" inputs so long as a first clock input remains at zero level. A change from zero level to an energizing level at the first clock input applies a "back-biasing" voltage to diodes connected to the respective bases of the first pair of transistors but does not change their state. During the interval that the energizing level prevails at the first clock input, however, a timing pulse appearing at a second clock input allows the second pair of transistors to assume any state dictated by the set and reset inputs. At the termination of the timing pulse, the voltage level at the second clock input returns to zero level to again block any signals from the set and reset inputs. Subsequently, the voltage level at the first clock input returns to zero level thereby enabling the first pair of transistors constituting the principal storage element to assume a conductive state dictated by the second pair of transistors which provide the interim memory function. The voltage level at the first and second clock inputs remains static until the next cycle thereby holding the principal storage element in its proper state until the following cycle of operation.

The above-mentioned and other features and objects of this invention and the manner of obtaining them will become more apparent by reference to the following description taken in conjunction with the accompanying drawings, wherein:

FIG. 1 illustrates a schematic circuit diagram of a preferred embodiment of the invention; and FIG. 2 shows voltage waveforms appearing at the clock inputs of the device of FIG. 1.

Referring now to FIG. 1 of the drawings, there is shown a schematic circuit diagram of a preferred embodiment of the invention. In particular, the device of the present invention includes an output flip-flop 10 including a first pair of p-n-p transistors 11 and 12 which may be of a type designated commercially as "2N964" having bases 13, 14, collectors 15, 16 and emitters 17, 18, respectively, the emitters 17, 18 being connected directly to ground. The bases 13, 14 of the transistors 11, 12 are connected, respectively, through resistors 19, 20 to a junction 21, which junction 21 is maintained at a potential of the order of +28 volts relative to ground by means of a connection to the positive terminal of a battery 22, an intermediate terminal of which is referenced to ground. In addition, the bases 13, 14 are connected, respectively, through resistors 23, 24 to collectors 16, 15. The collectors 15, 16 of the transistors 11, 12 are, in turn, connected respectively, through resistors 25, 26 to a junction 27 which is maintained at a potential of the order of −28 volts relative to ground by means of a connection to a negative terminal of the battery 22. Further, terminals 28, 30 are connected to the collectors 15, 16 of the transistors 11, 12 to provide $\overline{Q}$ and Q outputs, respectively.

In addition to the foregoing, the device of the invention includes an interim storage flip-flop 31 having a second pair of p-n-p transistors 32, 33 which may be of the aforementioned "2N964" type having, respectively, bases 34, 35, collectors 36, 37 and emitters 38, 39, the emitters being connected to a common terminal 40 designated as a clock pulse-one input. The bases 34, 35 of the transistors 32, 33 are connected, respectively, through resistors 42, 43 to the junction 21 and through resistors 44, 45 to collectors 37, 36. The collectors 36, 37 are, in addition, connected, respectively, through resistors 46, 47 to the junction 27, which junction 27 as previously specified is maintained at a potential level of the order of −28 volts relative to ground. Diodes 48, 49, which may be of a type designated commercially at "1N995," are connected, respectively, from collectors 36, 37 of transistors 32, 33 to bases 13, 14 of transistors 11, 12 and are poled to allow current flow towards transistors 11, 12.

Further, resistors 50, 51 are connected from junction 27 to terminals 52, 53, respectively, to provide a "reset" input and a "set" input. The reset and set inputs 52, 53 are characterized in that individually each input is maintained at open circuit or at ground potential by, for example, switches 64, 65, respectively. Set and reset inputs 53, 52 are both maintained at ground potential or ground potential and open circuit, but not both with the switches 64, 65 at open circuit. In addition, reset and set input terminals 52, 53 are connected, respectively, through resistors 54, 55 to junctions 56, 57; diodes 58, 59 are connected, respectively, to junctions 56, 57 from bases 34, 35 of transistors 32, 33, the diodes 58, 59 being poled to allow current flow towards the junctions 56, 57; and diodes 60, 61 are connected from a junction 62 to junctions 56, 57, respectively, and are poled to allow current flow towards the junctions 56, 57. Diodes 58, 59, 60 and 61 may also be of a type known commercially by the designation "1N995." Junction 62 is connected to a terminal 63 to provide a "clock pulse-two" or CP–2 Input.

When the aforementioned types of transistors 11, 12, 32, 33 and diodes 48, 49, 58, 59, 60, 61, together with the suggested voltages generated by the battery 22, the device of the invention may be fabricated with the respective resistors having the following ohmic values:

| | Ohms |
|---|---|
| Resistors 19, 20 | 240,000 |
| Resistors 23, 24 | 7,500 |
| Resistors 25, 26 | 18,000 |
| Resistors 42, 43 | 270,000 |
| Resistors 44, 45 | 10,000 |
| Resistors 46, 47 | 24,000 |
| Resistors 50, 51 | 24,000 |
| Resistors 54, 55 | 10,000 |

Lastly, a clock pulse-one generator 70 generates an energizing pulse that is applied to the clock pulse-one input 40 and, in addition, is employed to synchronize a clock pulse-two generator 72, the output pulse of which is applied to the clock pulse-two input 63. Referring to FIG. 2, waveforms 74, 76 show a clock pulse-one and a corresponding clock pulse-two generated by clock pulse-one generator 70 and clock pulse-two generator 72, respectively, for the device of FIG. 1 having the above-mentioned parameters. In particular, waveform 74 has a quiescent level, $V_1$, that is 1.0 to 1.5 volts positive relative to a reference level and periodically has a negative excursion for a period, $T_1$, to a potential level $V_2$, that is −0.5 volt relative to the reference level. The waveform 76 generated by the clock pulse-two generator 72, on the other hand, has a quiescent level, $V_3$, that is +1.5 to +2.0 volts positive to the reference level. In general, it is necessary that the level, $V_3$, be more positive than or equal to the level, $V_1$. After an interval of time, $\Delta t_1$, following the negative excursion of the waveform 74, the waveform 76 has a negative excursion for a period, $T_2$, to a voltage level, $T_4$, that is not critical and may be of the order of −6 volts negative relative to the reference level. Waveform 76 reverts to quiescent level, $V_3$, at an interval, $\Delta t_2$, prior to the termination of period, $T_1$. Intervals $\Delta t_1$ and $\Delta t_2$ provide tolerance in the generation of the respective clock pulses at the respective inputs of the anti-race flip-flops of the present invention throughout a system. If, for example, zero delay time to all parts of a system could be assumed, $\Delta t_1$ and $\Delta t_2$ could be made to approach zero. Clock pulse-two generator 72 includes an appropriate delay network (not shown) for determining the interval, $\Delta t_1$. The relative pulse width $T_1$ compared to the pulse width $T_2$ and the interval $\Delta t_1$ determines the interval $At_2$.

In the operation of the device of the present invention, Phases I, II, III and IV will be considered. Phase I is defined as when both clock pulses-one and -two are at levels $V_1$ and $V_3$, respectively; Phase II is defined as when clock pulse-one is at voltage level $V_2$ and clock pulse-two is at voltage level $V_3$, i.e., during the interval $\Delta t_1$; Phase III is defined as when clock pulse-one is at voltage level $V_2$ and clock pulse-two is at voltage level $V_4$, i.e., during the pulse interval $T_2$ of waveform 76; and Phase IV is when clock pulse-one is at voltage level $V_2$ and clock pulse-two is at voltage level $V_3$ subsequent to the occurrence of clock pulse-two. As previously noted, voltage level $V_3$ is more positive than or equal to the voltage level $V_1$.

Referring to FIG. 1 of the drawings, there are two flip-flop combinations; namely, the interim storage flip-flop 31 including transistors 32, 33 and the output flip-flop 10 including transistors 11, 12. Either one or the other of the transistors 11 or 12 and 32 or 33 are always in the conducting state. In the case of the interim storage flip-flop 31 including transistors 32, 33, the collector 36 or 37 of the transistor 32 or 33, respectively, that is conducting is maintained at substantially the same potential as the corresponding emitter 38 or 39. Also, resistors 43, 45 or 42, 44 connected to the collector 36, 37, respectively, corresponding to the transistor 32, 33 that is conducting form a voltage dividing network from the positive terminal of battery 22 to the respective collector 36 or 37 thus maintaining the opposite base 35 or 34 of transistor 33 or 32 positive relative to potential of the respective emitter 39 or 38 thereof.

As noted above, during Phase I a voltage of potential level $V_3$ is applied to terminal 63 thus maintaining both junctions 56, 57 at least as positive as potential level $V_3$. The clock pulse-one input at terminal 40, on the other hand, is maintained at potential level $V_1$ which is less positive than potential level $V_3$. Assuming that transistor 32 is conducting, the potential level $V_1$ at the emitter 38 appears at the base 34 whereby diode 58 is back-biased. The base 35 of transistor 33, on the other hand, is maintained slightly positive relative to potential level $V_1$ by the voltage divider network formed by resistors 43, 45 connected from the positive terminal of battery 22 to collector 36 of transistor 32 whereby transistor 33 is maintained in the non-conducting state and junction 57 remains at least as positive as potential level $V_3$. If transistor 33 is conducting, on the other hand, the reverse situation prevails. Reset and set inputs 52, 53 are either both at ground potential or either one but not both at open circuit, as determined by the position of the switches 64, 65, respectively. Clock pulse-two voltage level $V_3$ maintains junctions 56 and 57 at a minimum positive potential that is substantially equal to potential level $V_3$ irrespective of whether reset or set input terminals 52, 53 are at open circuit or at ground potential. Accordingly, the bases 34, 35 of transistors 32, 33 cannot experience and increase in potential level due to conditions prevailing at the reset and set inputs 52, 53 whereby the conductive states of the transistors 32, 33 do not change during Phase I.

During Phase II of operation, voltage level $V_1$ of clock pulse-one appearing at terminal 40 experiences a negative excursion to voltage level $V_2$ while the voltage level $V_3$ at clock pulse-two input terminal 63 remains fixed. The reduction in the voltage level at the emitters 38, 39 of transistors 32, 33 has the general effect of lowering the potentials on the collectors 36, 37 connected to diodes 48, 49 by a like amount. The diodes 48, 49 coupling the interim storage flip-flop to the output flip-flop are now both back-biased by the decrease in potential level applied to terminal 40, and the voltage level $V_3$ applied to clock pulse-two input terminal 63 prevents either of the junctions 56 or 57 from being affected by conditions prevailing at the reset or set inputs 52, 53. Thus, no change in the state of either the interim storage flip-flop 31 or the output flip-flop 10 takes place during Phase II of operation.

During Phase III of operation, the potential level $V_2$ appearing at the clock pulse-one input terminal 40 remains fixed and the voltage level $V_3$ at the clock pulse-two input terminal 63 experiences a negative excursion to voltage level $V_4$ which is of the order of −6 volts relative to ground and is necessarily more negative than voltage level $V_2$. Under these conditions, the voltage appearing at junctions 56, 57 may go negative if dictated by conditions at the reset input 52 or the set input 53. As previously specified, the switches 64, 65 may both be closed or one but not both may be at open circuit. With transistor 32 conducting and with switches 65 and 64 closed, i.e., with set input 53 and reset input 52 maintained at ground potential, consider the action of interim storage flip-flop 31. Under these conditions, voltage-dividing network formed by resistors 43, 45 maintains the base 35 of transistor 33 positive relative to the potential of emitter 39, i.e., potential level $V_2$. Thus, under these conditions transistor 33 commences Phase III in the non-conducting state. With switch 65 open, however, the potential of base 35 of transistor 33 goes negative relative to the potential of emitter 39 thus allowing transistor 33 to commence conducting. The concomitant increase in potential at base 34 terminates conduction through transistor 32. Alternatively, when switch 64 is opened, thus allowing reset input 52 to assume the potential dictated by the voltage division between resistors 50, 54, diode 58 and resistor 42, the ohmic value of resistors 50, 54 and 42 is such that the base 34 goes or remains negative relative to the potential of emitter 38, whereby transistor 32 either continues to or commences to conduct. In view of the symmetry of the circuit of the present invention, it is evident that during Phase III if both reset and set inputs 52, 53 are at ground potential, no change in the conductive state of transistors 32, 33 occurs. Alternatively, if either switch 64 or 65 is at open circuit, the corresponding transistor 32 or 33 will commence to or continue to conduct during Phase III. Also, the potentials available at the respective anodes of diodes 48, 49 are negative to the extent that the interim storage flip-flop 31 remains decoupled from the output flip-flop 10.

During Phase IV of operation, the voltage level at the clock pulse-two input increases positively from $V_4$ to $V_3$ thereby preventing junctions 56, 57 from going more negative than the $V_3$ level. This change in voltage levels in conjunction with diodes 58, 59 decouples the reset and set inputs 52, 53 from the interim storage flip-flop 31. Thus, there is no change in the conductive states of the transistors 32, 33 or 11, 12 during Phase IV of operation, the purpose of Phases II and IV being to provide tolerance in the generation of the clock pulses-one and -two at a particular point in a system.

During Phase I of operation, the clock pulse-two input remains at voltage level $V_3$. The clock pulse-one input, however, increases positively from voltage level $V_2$ to voltage level $V_1$. This positive increase in voltage levels increases the collectors 36 and 37 of the transistors 32 and 33 by a similar amount. This increase in potential is positive relative to ground potential thereby coupling the interim storage flip-flop 31 through diode 48 or 49 to the output flip-flop 10. The increase of the potential applied to the base 13 or 14 of transistors 11, 12 causes the transistor 11 or 12 to cease conducting that corresponds to the transistor 32 or 33 that is in the conductive state. For example, if transistor 33 is conducting, the increase in potential level from $V_2$ to $V_1$ at clock pulse-one input 40 will cause transistor 12 to cease or remain non-conductive. Likewise, if transistor 32 is conducting, the increase in potential at clock pulse-one input 40 will cause transistor 11 to cease or remain non-conductive. Under circumstances where transistor 12 is in the conductive state and the resistors 19, 20, 23, 24, 25, 26 have the ohmic values previously specified, the Q output terminal 30 is maintained at —0.18 volt and the $\overline{Q}$ output terminal 28 is maintained at —8.24 volts relative to ground. A change in the conductive state from transistor 12 to transistor 11 reverses the potentials appearing at the Q and $\overline{Q}$ terminals 30, 28.

Although the invention has been shown in connection with a certain specific embodiment, it will be readily apparent to those skilled in the art that various changes in form and arrangement of parts may be made to suit requirements without departing from the spirit and scope of the invention. For example, n-p-n transistors can be used in lieu of the p-n-p transistors of the disclosed embodiment by merely changing the polarity of the clock pulses-one and -two, the diodes 48, 49, 58, 59, 60, 61 and the connections to the battery 22.

What is claimed is:

1. A digital computer one bit storage device adapted to be driven by first and second concurrent clock pulses, each of said first and second clock pulses being of predetermined voltage levels and amplitude, said one bit storage device comprising a first bistable storage element having first, second, set and reset input terminals for producing first and second bilevel energizing voltages; means for applying said first clock pulse of predetermined voltage levels to said first input terminal of said first bistable storage element thereby to shift the voltage levels of both of said first and second bilevel energizing voltages; means connected to said set input terminal and to said reset input terminal for setting or resetting said first bistable storage element thereby to determine the state thereof; gating means interconnected between said set and reset input terminals and said first and second input terminals, respectively, of said first bistable storage element, said gating means being adapted to receive said second clock pulse thereby to restrict the interval of time during which said state of said first bistable storage element can be set or reset to the duration of said second clock pulse; and a second bistable storage element having set and reset input terminals adapted to receive said first and second bilevel energizing voltages, respectively, said set and reset terminals of said second bistable storage element being biased relative to said first and second bilevel energizing voltages for determining the state thereof only during non-shifted periods.

2. A digital computer system comprising:

(a) means for generating a first series of clock pulses of uniform predetermined voltage levels and amplitude;

(b) means for generating a second corresponding series of clock pulses of uniform predetermined voltage levels and amplitude, each of said second series of pulses being concurrent with at least a portion of a corresponding one of said first series of pulses;

(c) a first bistable storage element having first, second, set and reset input terminals for producing first and second bilevel energizing voltages, said first input terminal being adapted to receive said first series of clock pulses for shifting the voltage levels of said first and second bilevel energizing voltages and said second input terminal being adapted to receive said second series of clock pulses;

(d) means connected to said set input terminal and said reset input terminal of said first bistable storage element for selecting the state of said first and second bilevel energizing voltages;

(e) gating means interconnected between said set and reset input terminals and said second input terminal of said first bistable storage element for restricting the intervals of time that said state of said first bistable storage element can be selected to the respective durations of said clock pulses of said second series; and (f) a second bistable storage element having set and reset input terminals connected to receive said first and second bilevel energizing voltages, respectively, for selecting the state of said second bistable storage element, said set and reset input terminals of said second bistable storage element being biased relative to said first and second bilevel energizing voltages thereby to prevent changes in said state of said second bistable storage element during intervals coextensive with said first series of clock pulses.

3. The digital computer system as defined in claim 2 wherein the respective pulses of said first series of clock pulses are of longer duration than the pulses of said second series of clock pulses thereby to provide tolerance in generating said pulses of said second series of clock pulses concurrent with said first series of clock pulses at any location in said system.

4. A one bit storage device designed to receive first and second series of concurrent clock pulses, said one bit storage device comprising:

(a) means including a first flip-flop having first and second transistors, each having first, second and third elements, said first elements of said first and second transistors being connected to first and second input terminals for producing first and second bilevel energizing voltages at respective second elements of said first and second transistors;

(b) means for driving said third elements with said first series of clock pulses for periodically shifting both of the potential levels of said first and second bilevel energizing voltages relative to a substantially fixed reference potential level;

(c) means including first and second gating devices for driving said first flip-flop thereby to determine the conductive states of said first and second transistors thereof;

(d) means interconnected between said first and second gating devices and said first and second input terminals, respectively, of said first flip-flop and adapted to receive said second series of clock pulses for restricting the interval of time for determining said conductive states of said first and second transistors of said first flip-flop to the respective durations of said second series of clock pulses; and (e) means including a second flip-flop having third and fourth transistors each having first, second and third elements, said first elements of said third and fourth transistors being maintained at said substantially fixed reference potential level and said second elements being connected to said second elements of said first and second transistors, respectively, for providing memory of the state of said first and second bilevel energizing voltages whereby said third elements of said third and fourth transistors of said second flip-flop provide first and second output terminals from said one bit storage device.

5. A one bit storage device designed to receive first and second series of concurrent clock pulses, each of said first and second series of clock pulses having predetermined quiescent potential levels with the quiescent potential level of said second series being more positive than the quiescent potential level of said first series relative to a reference potential level, said first and second series of clock pulses being formed by negative excursions, said device comprising:

(a) means including a first flip-flop having first and second p-n-p transistors, each having an emitter, a collector and a base, said bases of said first and second transistors being connected to first and second input terminals for producing first and second bilevel energizing voltages at said collectors;

(b) means for driving said emitters of said first and second transistors with said first series of clock pulses for periodically shifting the potential levels of both said first and second bilevel energizing voltages relative to said reference potential level;

(c) means including first and second gating devices for driving said first flip-flops thereby to determine the conductive states of said first and second p-n-p transistors thereof;

(d) gating means interconnected between said first and second gating devices and said first and second input terminals, respectively, of said first flop-flop and adapted to receive said second series of clock pulses for restricting the interval of time for determining said conductive states of said first and second p-n-p transistors of said first flip-flop to the respective durations of said second series of clock pulses;

(e) a second flip-flop including third and fourth transistors each having an emitter, a collector and a base, said emitters of said third and fourth transistors being maintained at said reference potential level; and (f) first and second diodes connected from said collectors of said first and second transistors to said bases of said third and fourth transistors, said first and second diodes being poled to allow current flow towards said bases of said third and fourth transistors whereby said collectors of said third and fourth transistors of said second flip-flop provide first and second output terminals from said one bit storage device.

References Cited by the Examiner

UNITED STATES PATENTS 3,177,374 4/1965 Simonian et al. ______ 307—88.5

ARTHUR GAUSS, *Primary Examiner.*

S. D. MILLER, *Assistant Examiner.*